Patented Nov. 28, 1933

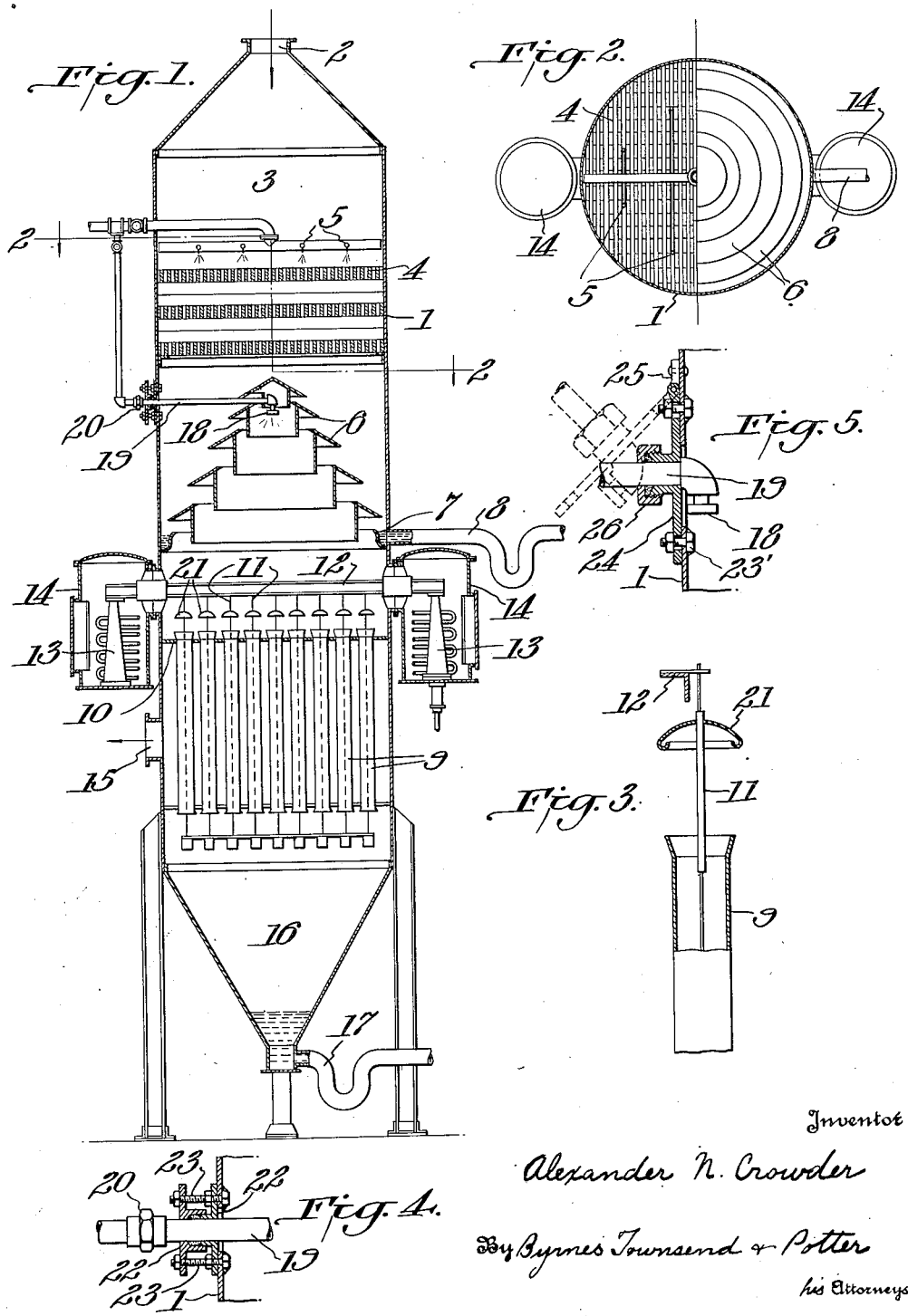

1,937,265

UNITED STATES PATENT OFFICE 1,937,265

GAS CLEANING TOWER

Alexander N. Crowder, Bound Brook, N. J., assignor to Research Corporation, New York, N. Y., a corporation of New York Application October 6, 1931. Serial No. 567,284

10 Claims. (Cl. 183—7)

This invention relates to apparatus for removing suspended or entrained particles from gases, and more particularly to apparatus in which the gases are first washed with liquid and later subjected to those cleaning processes which are commonly called electrical precipitation.

The material carried by some gases, such as metallurgical gases, includes relatively coarse material which may be readily removed by washing, and finer particles of dust and fume which can be readily removed by electrical precipitation but which are not economically removed by a washing operation.

An object of the invention is to provide a compact and efficient gas treating tower in which the gas is subjected to washing and to electrical precipitation operations for effecting the successive removal of the coarser suspended material and the fine particles of dust and fume. A further object is to provide apparatus of the type stated in which the washing of the gases and the electrical treatment thereof may be carried on under conditions especially favorable for each of these operations. More specifically, an object is to provide a gas cleaning tower in which the gases, flowing downward through the tower, pass successively through a gas washer, a water remover, a humidifier, and an electrical precipitator.

These and other objects of the invention will be apparent from the following specification, when taken with the accompanying drawing, in which, Fig. 1 is a central vertical section through a cleaning tower which embodies the invention, Fig. 2 is a horizontal section on line 2—2 of Fig. 1, Fig. 3 is a fragmentary sectional view of the upper portion of a discharge and collecting electrode unit, and Figs. 4 and 5 are fragmentary detail views illustrating arrangements for mounting the spray head.

In the drawing, the reference numeral 1 identifies the vertically arranged tower or cylindrical shell in which all of the several cleaning and gas treating operations are effected. A gas inlet opening 2 is provided at or adjacent the top of the tower 1 and, when distributing baffles are not provided, the washing and scrubbing unit is located a substantial distance below the inlet 2 to provide an open space 3 for securing a uniform distribution of the gas flow. The checkerwork 4 is kept continuously wetted by liquid supplied through spray nozzles 5, the wash liquid usually being water but other liquids or solutions may be used.

Dewatering louvres or vanes 6 are arranged below the scrubber 4 to relieve the gas stream of excess water which falls from the checkerwork or which is carried in suspension in the gases. A trough 7 at the base of the dewatering louvres receives the sludge and excess water which is removed by the louvres, and discharges the same from the tower through a pipe 8 which is provided with suitable traps or drains for preventing escape of the gases.

The tower section below the dewatering louvres houses an electrical precipitator which is shown as including a series of pipe collecting electrodes 9 that are mounted on a header 10, and discharge electrodes 11 that are suspended from a framework 12 that extends beyond the tower 1 and is supported on insulators 13. The insulators 13 are mounted in the usual insulator chambers 14. The gas outlet 15 is preferably located some distance above the bottoms of the collecting electrodes 9, and the bottom of the tower forms a hopper 16 which is provided with a trapped drain pipe 17.

For most efficient operation, the amount of water entering the precipitator section with the gases should be regulated in accordance with the quantity of material in the gases entering the precipitator. A spray or set of spray nozzles 18 is provided within the louvre assembly 6, and water is supplied to these sprays through a valved pipe line 19 that is preferably provided with a compression coupling or union 20. The packed gland through which the pipe 19 enters the tower may comprise two mating sections 22, of conventional construction, which are connected to each other and to the shell 1 by bolts 23 which are welded to the shell. Upon removal of the securing nuts, and opening the compression coupling 20, the pipe 19 and spray head 18 may be withdrawn from the tower. In the alternative construction shown in Fig. 5, the relatively fixed portion of the packing is formed as a boss on a plate 24 that is pivoted to a bracket 25 on the shell 1. To inspect the spray head 18, the cap nut 26 of the packing is loosened and the pipe 19 may be slid in the gland, after opening union 20, to bring the spray head against the inner face of plate 24. The securing nuts on the bolts 23' are removed, and the plate 24 may be tilted to bring the spray head to the exterior of the tower. With either of these arrangements, the spray nozzles may be readily removed from the tower for inspection and cleaning, thus rendering it unnecessary to enter the tower to perform these operations which, particularly when the water for spraying is not clean, should be performed at regular and relatively short intervals.

The spray nozzles 18 deliver water in the form of a fine spray or mist since coarse water particles or streams of water not definitely suspended in the gas stream would collect on the high voltage framework 12, and drop from the framework in little streams which would prevent proper insulation of the high voltage framework from the grounded members, such as the header plate 10 around the top of the pipes.

To prevent dropping water from falling directly into the collecting pipes, small disks 21, with inturned edges, Fig. 3, are provided for each discharge electrode 11, being mounted on the electrode or on the supporting framework, and placed at such distance from the top of the pipe that water dropping from the disk will be drawn out to such degree that discharge between the disk and the top of the pipe will not take place.

The operation is as follows: Raw gases entering at the top of the tower are washed and scrubbed, by direct washing from the sprays 5 and by impingement on the wet surfaces of the checkerwork 4. The coarser particles are removed from the gases and the sludge drops to the collecting trough 7. Drops of water of appreciable size are removed from the gas stream as it passes through the dewatering louvres 6.

If desired, additional water in controlled amount is then added to the gases by spray nozzles 18 and the gases, relieved of the heavier dust but carrying fine dust and fume and some entrained water mist, enter the collecting electrode pipes 9. The entrained water mist is thrown to the surface of the pipes, near the top, almost immediately as the gases enter the pipes and are subjected to the electric forces therein. The water runs down the surface of each pipe and tends to wash them free from deposits of precipitated material. The water and fume removed in the precipitator collect as a sludge, which slides down and through pipes 9, and is retained in hopper 16.

On leaving the precipitator section, the gases are subjected to an abrupt change in direction to reach the gas outlet 15. This manner of directing the gases out of the precipitator is of great value in bringing about a distribution of gases in the several pipes, and in quickly removing the cleaned gases from the sludge which drops from the ends of the pipe electrodes.

It is to be noted that the apparatus is very compact and that no flues are required between the cleaning units. This is particularly advantageous in metallurgical practice as the various units of a plant should be centralized, to permit centralized supervision since satisfactory operation is frequently dependent upon a close coordination of the different operations. The elimination of flues between the cleaning units is also advantageous as flues are expensive to install and maintain, especially when lined to prevent change in the temperature of the gases passing through them, and they present locations where suspended matter may drop or be thrown out of the gas stream, and their use results in a drop of gas pressure which may be undesirable.

The provision of the dewatering unit permits an independent control of the water employed in the scrubbing and in the precipitation operations, thus enabling each to be carried on under the most suitable conditions. The cooling and saturation of the gases which is carried out so completely in the scrubber is a desirable preliminary to the precipitator treatment and, after the removal of excess water, additional water in the form of a fine mist may be supplied when required or desirable for most efficient operation of the precipitator. The dewatering unit has the additional function of assisting in the distribution of the gases to the several units of the precipitator.

It is to be understood that the particular construction herein illustrated and described is but one typical embodiment of the invention, and that various changes may be made in the several parts, as well as their relative size and arrangement, without departing from the spirit of the invention as set forth in the following claims.

I claim:

1. A gas cleaning tower comprising a vertically arranged shell having an inlet opening at the upper end thereof, a gas scrubber within the upper end of said shell, means for supplying wash liquid to said scrubber, a down-flow electrical precipitator within said shell and below said scrubber, and means for eliminating water from the gas stream as it passes from the scrubber to precipitator, said shell having a gas outlet adjacent the lower end thereof.

2. Apparatus for cleaning gases comprising a vertical shell having gas inlet and outlet openings, a gas scrubber within said shell adjacent the inlet opening, means for supplying wash liquid to said scrubber, an electrical precipitator positioned in said shell adjacent the outlet opening and below said scrubber, and means between said scrubber and said precipitator for distributing the gases horizontally over said precipitator as the gases enter said precipitator.

3. A gas cleaning tower comprising a vertically arranged shell having an inlet opening at the upper end thereof, a gas scrubber within the upper end of said shell, means for supplying wash liquid to said scrubber, a down-flow electrical precipitator within said shell and below said scrubber, means for eliminating water from the gas stream as it passes from the scrubber to precipitator and a hopper provided by the lower end of said shell for receiving sludge removed from the gases by said precipitator, said shell having a gas outlet adjacent the lower end thereof.

4. The invention as set forth in claim 3, wherein said gas outlet is at a higher level than the outflow end of the precipitator, whereby the gas stream is turned upwardly as it leaves the downflow precipitator.

5. A gas cleaning tower comprising a vertically disposed cylindrical shell having a gas inlet at its upper end, a gas scrubber in the upper portion of said shell, sprays for supplying washing liquid to said scrubber, a dewatering device in said shell for removing excess water from the gas stream as it moves downwardly from said scrubber, an electrical precipitator in said shell below said dewatering device, and means for supplying liquid to the precipitator to establish a flow of water over the collecting electrodes thereof.

6. The invention as set forth in claim 5, wherein said precipitator is of the downflow type, and said means comprises a spray nozzle for supplying water in the form of a mist to the gas stream after it leaves said dewatering device.

7. In a gas cleaning tower, the combination with a vertically arranged cylindrical shell having a gas inlet at the upper end thereof, a checkerwork within the upper portion of said shell, sprays for supplying a washing liquid to said checkerwork, and a dewatering device below said checkerwork, of an electrical precipitator within said shell below said dewatering device, said precipitator comprising a header plate, collecting pipe electrodes supported by said header plate, and a discharge electrode within each collecting pipe electrode.

8. The invention as set forth in claim 7, in combination with means for injecting a water mist into the gas stream as it passes from the dewatering device to the precipitator.

9. The invention as set forth in claim 7, in combination with a spray head removable bodily from said shell and normally positioned between said dewatering device and said precipitator.

10. The invention as set forth in claim 7, wherein said shell is provided with a gas outlet located above the bottoms of said collecting pipe electrodes.

ALEXANDER N. CROWDER.